W. L. MARBLE.
CREEL OR TROUT BASKET.
APPLICATION FILED APR. 17, 1920.
1,388,187.
Patented Aug. 23, 1921.
3 SHEETS—SHEET 2.
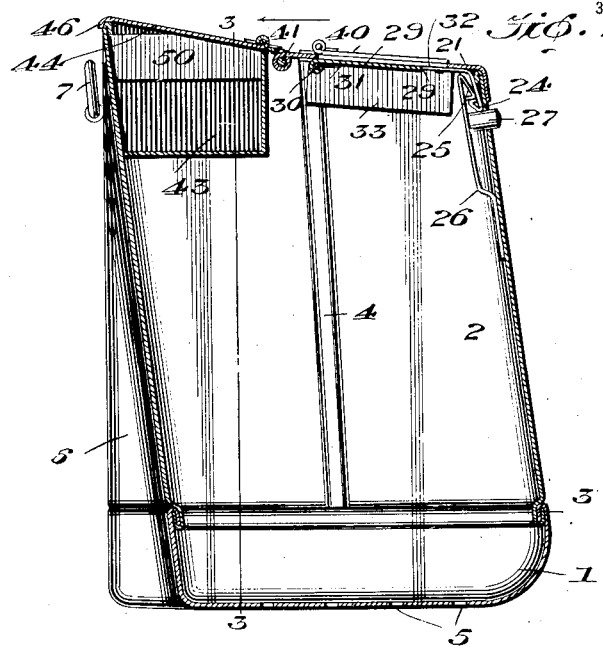
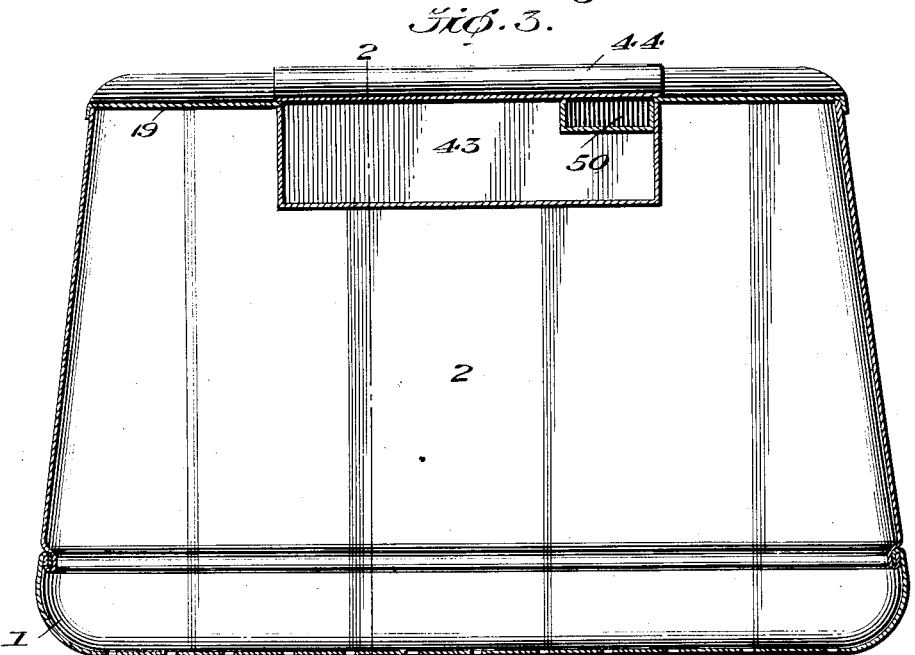

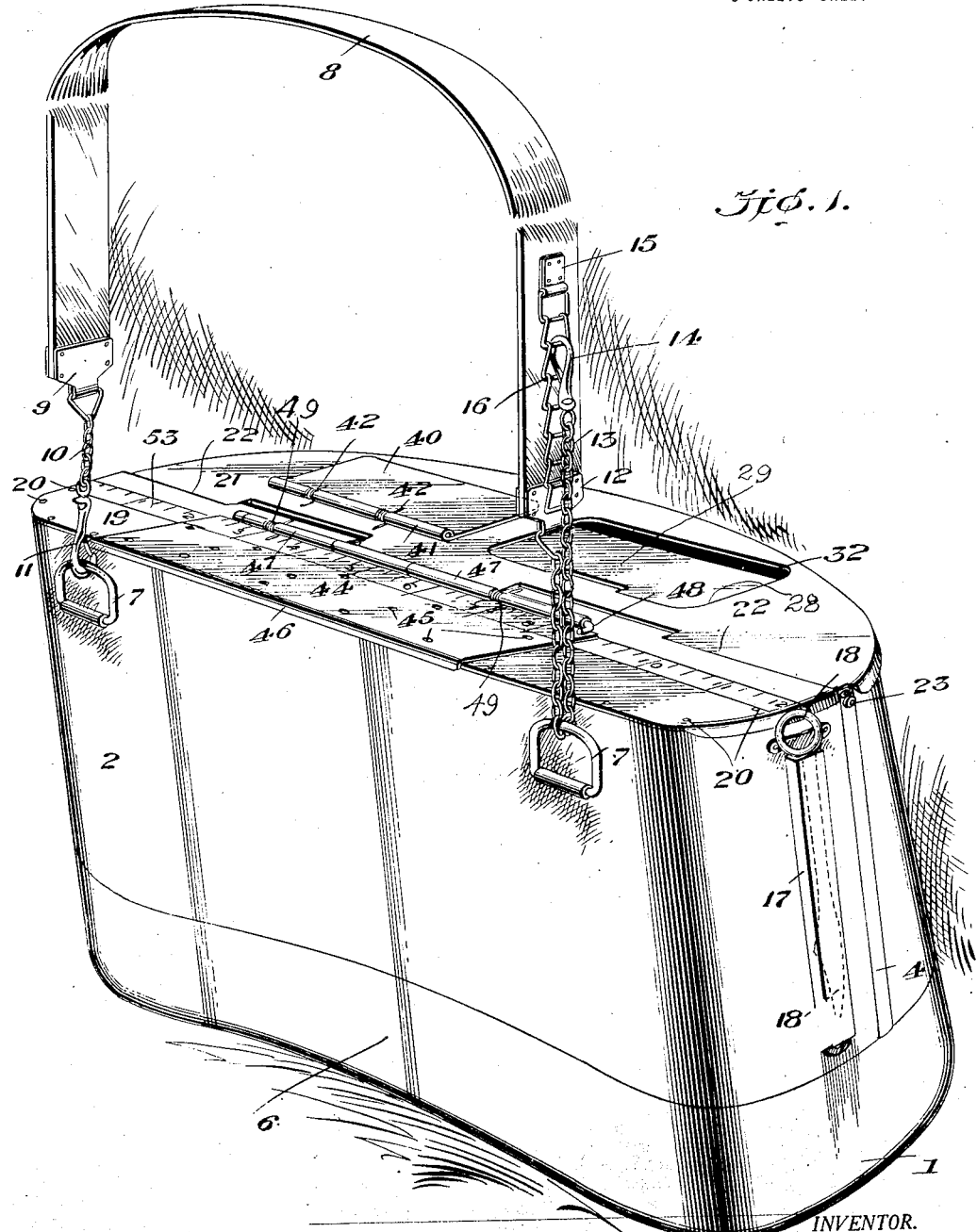

W. L. MARBLE.
CREEL OR TROUT BASKET.
APPLICATION FILED APR. 17, 1920.
1,388,187.
Patented Aug. 23, 1921.
3 SHEETS—SHEET 3.
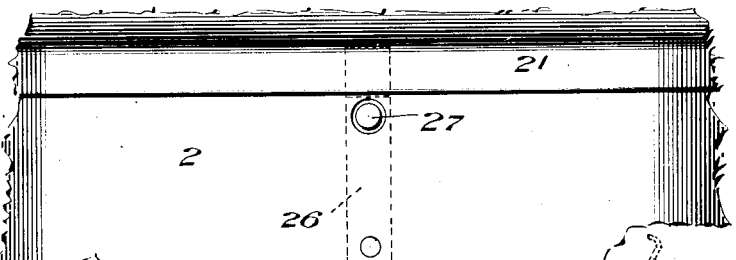
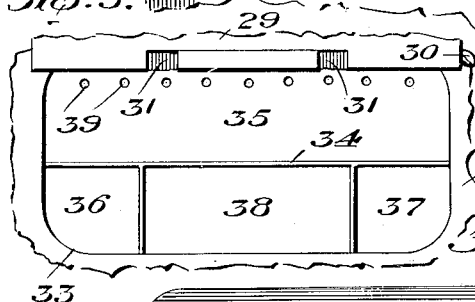
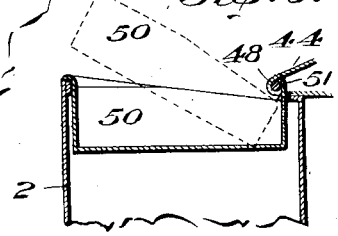
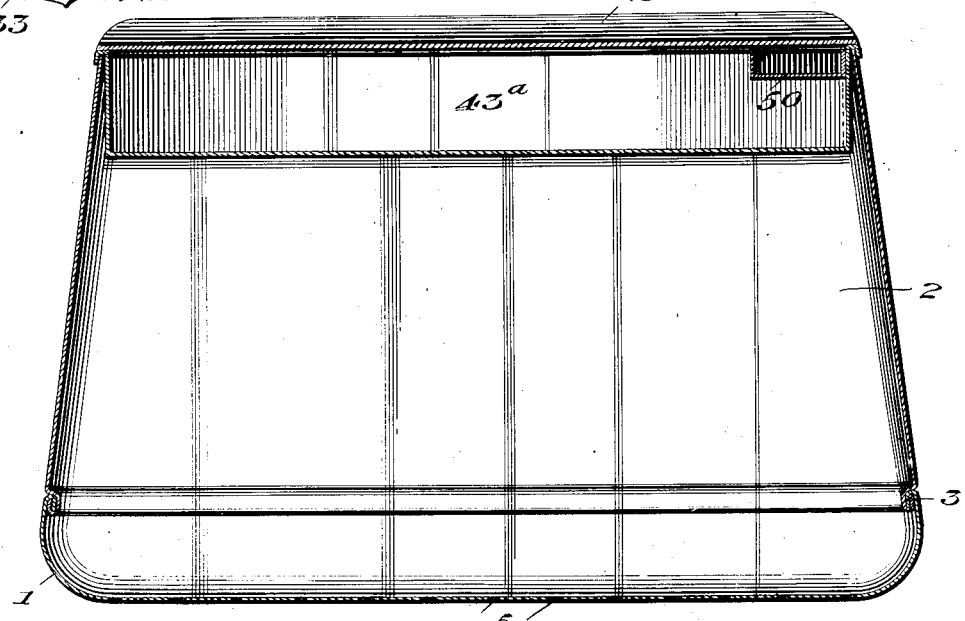
Webster L. Marble
INVENTOR.

UNITED STATES PATENT OFFICE.

WEBSTER L. MARBLE, OF GLADSTONE, MICHIGAN.

CREEL OR TROUT-BASKET.

1,388,187.  Specification of Letters Patent.  Patented Aug. 23, 1921.

Application filed April 17, 1920. Serial No. 374,577.

*To all whom it may concern:*

Be it known that I, WEBSTER L. MARBLE, a citizen of the United States, residing at Gladstone, in the county of Delta and State of Michigan, have invented certain new and useful Improvements in Creels or Trout-Baskets, of which the following is a specification.

The ordinary creel or basket for holding fish, such as is carried by the fisherman, has a number of defects among which may be mentioned the unpleasant odor due to the wetting of the material and impossibility of cleansing; insecurity of the cover, from which cause game fish such as trout, for instance, often escape; lack of satisfactory provision for holding bait, hooks, swivels and other accessories, and liability of spoiling the flavor of the fish, due to the unsanitary condition which must necessarily prevail in a basket of that character.

My object is the provision of a durable, light and sanitary creel or trout basket which will overcome the defects of the ordinary willow creel and, in addition, have improvements in the nature of compartments or holders for bait, matches, hooks, flies, swivels and similar fishing paraphernalia conveniently arranged for access without having to open the basket. My improvements embody, still further, a self-closing door for the opening through which the trout or other fish are passed to the interior of the creel, thereby preventing the escape of any of the fish. A further improvement is the construction and arrangement of the cover, whereby easy access may be had to the interior of the creel and by which a compact and convenient arrangement of the compartments and the fish-receiving opening and its door is obtained.

Another improvement resides in a scale on the stationary part of the cover, said scale being, in part, marked on the cover to the bait compartment, thereby utilizing the full length of the cover without limiting the size and location of the bait compartment.

For the purpose of conveniently holding an improved fish knife there is provided a scabbard or receiver so that the fisherman always has this knife handy and does not have to rely upon a knife carried on the person; furthermore, this provision for a knife on the creel tends to insure against loss of the knife.

The invention embodies a novel relationship of bait holder and match box holder, both protected by the same cover.

Other features of the invention appear more fully in the following description and are shown in the accompanying drawings. The invention is not limited to the specific form and arrangement of parts, compartments and features hereinbefore referred to and which are described in detail hereinafter as modification is possible without departing from the spirit of the invention.

In the accompanying drawings:

Figure 1 is a perspective showing the creel or basket ready for use with a sling or adjustable hanger applied;

Fig. 2 is a vertical section on line 2—2 of Fig. 3;

Fig. 3 is a longitudinal section on line 3—3 of Fig. 2;

Fig. 4 is a detail of the front of the creel showing the push button for the latch;

Fig. 5 is a plan view of a certain holder having compartments;

Fig. 6 is a detail view showing the hinged match box holder, and

Fig. 7 is a longitudinal section similar to Fig. 3 showing a modification where the bait holder runs the entire length of the creel.

The creel or basket is formed throughout of some suitable rigid sheet material, preferably aluminum, for the sake of lightness, strength and sanitation. While I do not limit myself thereto, the body may comprise a one-piece bottom 1, and a main portion 2 connected to the bottom 1 by a seam 3 and having a vertical seam or seams 4. The bottom 1 is provided with a suitable number of openings or perforations 5 which give free drainage. As shown in Figs. 1 and 2, that part of the creel which lies against the body is hollowed or concaved as at 6 to cause it to rest comfortably. Rings 7 on the back of the body afford means for the connection of a suitable sling or strap by which the creel is suspended from the shoulder. The sling illustrated has the advantage of adjustability and easy attachment and disconnection, said sling comprising a strap of leather or webbing 8 having a metal clip 9 at one end to which is connected a chain 10 provided with a snap hook 11 adapted to engage one of the loops 7. At the other end of the strap 8 is a clip 12 to which is connected a long chain 13 which passes through the loop 7 and is provided with a snap hook 14. Secured to the strap 8 by a clip 15 is a chain 16. The snap hook 14 may be engaged with any link of the chain 16. Adjustment may be thus effected to suit the convenience of the fisherman.

Referring to Fig. 1, there is provided a scabbard or holder 17 on the body 2 for the reception of a fish knife 18 which is of a form at present on the market. The fish knife is thus conveniently positioned for immediate use when desired without requiring the fisherman to resort to a knife carried on the person and, furthermore, the likelihood of losing or misplacing the knife is minimized.

The creel is closed by a two-part cover of which one section 19 is stationary, being suitably secured at 20 to the body 2. The other section 21 is connected to section 19 by a hinge comprising loops or eyes 22 on the cover sections 19, 21, and a hinge rod 23 running through said loops and journaled in the body 2. This construction provides a cover which is split longitudinally, affording ample access to the interior of the creel. The cover section 21 is firmly secured by a latch having hook members 24, 25 on the section 21 and body 2, respectively, the hook 25 forming a part of a spring 26 which has a push button 27 extending through a hole in the body 2. The cover section 21 may be quickly snapped shut and will automatically lock but may be easily released by pressing on the button 27. This latch insures against the fish jumping out, as the natural act of closing the cover 21 results in its being locked.

Many fish have been lost by their jumping out of the creel when they are placed therein, or because of insecurity of the cover. I have provided means to prevent loss of fish from this cause. The cover 21 is normally closed. In the cover is an opening 28 of sufficient size to admit the largest fish that would be introduced into the creel. The opening is closed by a self-closing cover 29 which is hinged at 30 on the under side of the cover 21. Springs 31, Fig. 2, which are coiled around the hinge pin, keep the door or closure 29 in the position shown in Fig. 1 and, as this door is an inwardly opening one, it is obvious that a fish cannot jump out. To prevent the fingers from getting caught and also to afford the greatest possible freedom of entry of the fish through the opening 28, the door 29 is of less width than the opening 28, thus leaving an opening or slot 32. The slot also serves to admit air to the interior of the creel.

A multi-compartment holder is provided on the cover section 21 for hooks, swivels, sinkers, flies and snells, and other fishing paraphernalia. The exact number of compartments and their precise arrangement is not essential. In Figs. 2 and 5 there is shown a box-like holder 33 depending from the cover section 21 and having partitions 34 subdividing it into a long compartment 35 and smaller compartments 36, 37, 38. The bottom of the compartment 35 may have perforations 39. The holder 33 is provided with an outer cover or door 40 hinged at 41 to the section 21 and provided with springs 42 which keep it closed.

Referring to Figs. 2 and 3, depending from the fixed section 19 of the cover is a bait holder 43 which may be of any desired length. In Fig. 3 this bait holder occupies a portion of the length of the cover section 19. In the modified form shown in Fig. 7 I have shown a bait holder 43ª running the whole length of the cover section 19. Whatever the length of the bait holder may be, it is securely closed by a door or cover 44 which is perforated at 45 to admit air. Preferably, the cover 44 has a lip 46 which overhangs the upper edge of the body 2. The cover 44 and the section 19 have hinge loops or eyes 47 through which extends a rod 48. Springs 49 coiled around the rod 48 hold the cover 44 tightly closed.

A match box holder 50 which is provided with eyes 51 by which it is hinged loosely on the rod 48, is adapted to be disposed within the holder 43 and to be covered by the door 44. The match box holder 50 has a catch or lip 52 to engage over the upper edge of the body 2. Thus, without interfering with the bait in the holder 43, matches may be carried about, suitably connected by the cover 44, ready for immediate use.

A scale extends lengthwise of the section 19, parts 53 of the scale being on said section and the remainder of the scale 54 being carried by the door 44. Thus, without the necessity of narrowing the bait holder, I am enabled to use a scale, preferably twelve inches long, running the full length of the creel. The fisherman may quickly measure any fish caught for the purpose of determining whether it shall be restored to the water and, also, to know the exact length of each fish should the occasion arise.

What I claim is:

1. A creel or trout basket having a cover provided with an opening for the introduction of the fish, a snap-catch for the cover and an inwardly swinging automatically closing door or cover for said opening, said door being of smaller size than the opening, whereby a part of the opening is uncovered.

2. A creel or trout basket provided with a stationary holder depending therein, a movably mounted supplemental holder positioned within the holder first named, and a cover or closure common to said holders.

3. A creel or trout basket provided with a holder, a hinged closure or door for said holder, and a hinged match box holder adapted to be folded inside the first named holder and which is also covered by said door.

4. A creel or trout basket having a cover composed of a fixed section and a hinged section, said sections each having a holder depending therefrom into the creel and each having a door for said holder.

In testimony whereof I affix my signature.

WEBSTER L. MARBLE.